May 7, 1929.　　A. M. W. CARTER　　1,711,720
TRAILER BRAKE
Filed March 6, 1925
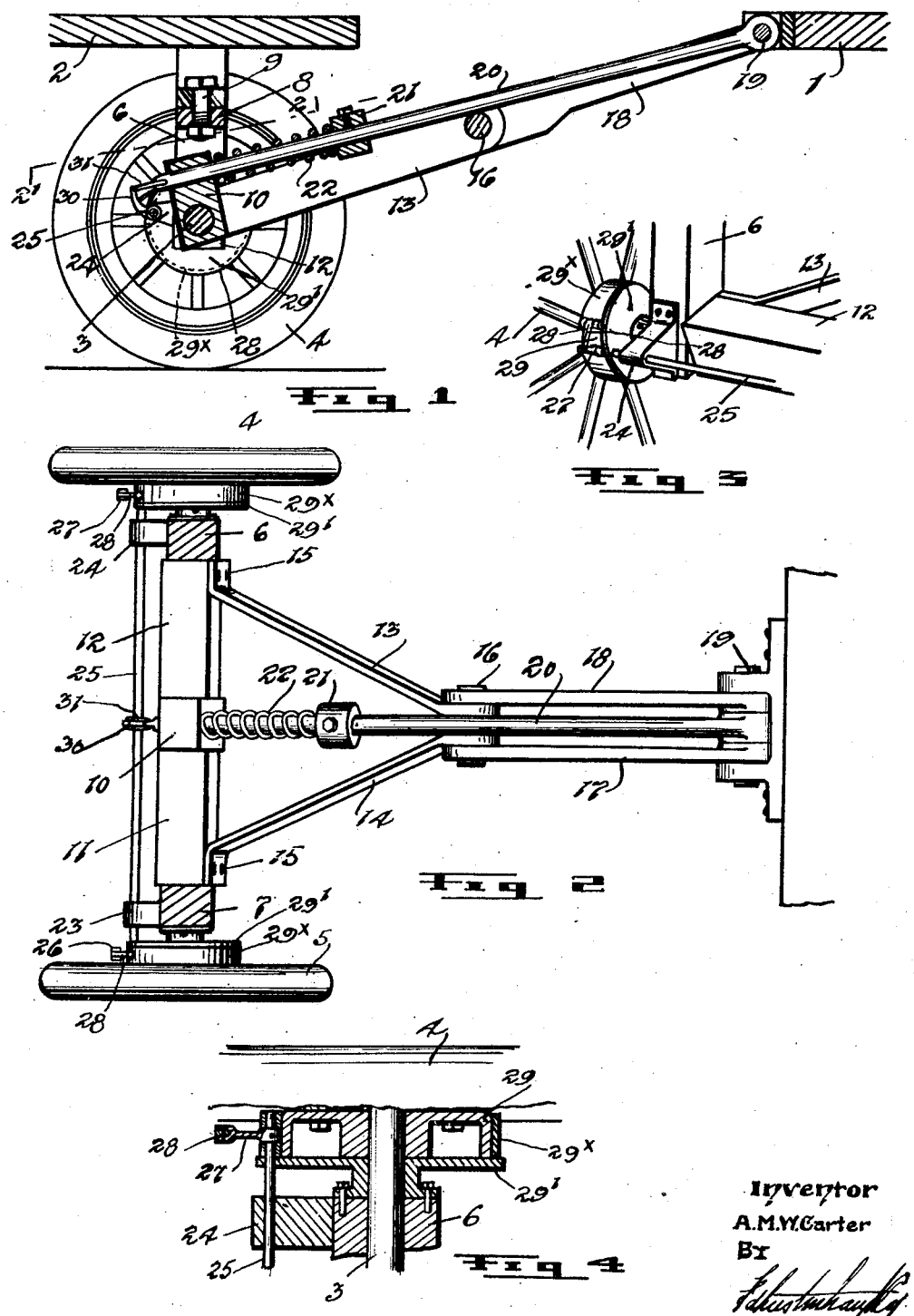
Inventor
A.M.W.Carter
By Patented May 7, 1929.

1,711,720

UNITED STATES PATENT OFFICE.

ALFRED M. W. CARTER, OF WINNIPEG, MANITOBA, CANADA.

TRAILER BRAKE.

Application filed March 6, 1925, Serial No. 13,567, and in Canada February 24, 1925.

The invention relates to improvements in trailer brakes and an object of the invention is to provide a brake for a trailer which will automatically apply the brakes on the front wheels of the trailer should the trailer attempt to close in on the truck or other vehicle pulling the same, the application of the brakes being brought about by the momentum of the trailer.

A further object of the invention is to provide an automatic braking device of simple construction and which can be positively relied upon to do the work for which it is designed.

With the above more important objects in view, the invention consists essentially in the arrangement and construction of parts hereinafter more particularly described, reference being had to the accompanying drawing in which:

Fig. 1 is a vertical longitudinal sectional view through the device, the operating bar being shown in side elevation.

Fig. 2 is a sectional view at 2—2' Figure 1 and looking downwardly.

Fig. 3 is a perspective view of the brake drum and parts associated therewith.

Fig. 4 is an enlarged detailed horizontal sectional view centrally through one of the brake drums and parts associated therewith.

In the drawing like characters of reference indicate corresponding parts in the several figures.

This invention can be used where one vehicle is drawing another and is particularly adapted for use where automobile trucks are drawing trailers.

I have not herein considered it necessary to show either the truck or the trailer in detail.

The back of the truck or pulling vehicle is indicated generally by the reference numeral 1, and the front of the trailer or pulled vehicle by the reference numeral 2. The front axle 3 of the trailer is carried by the front wheels 4 and 5 and on it I mount a pair of opposing posts or standards 6 and 7 which are connected permanently together by a cross beam or bar 8. The front end of the trailer body is supported by the bar, being swivelly connected thereto by a centrally positioned king bolt 9.

From the above it will be obvious that the front wheels, supporting the truck body, can be steered by turning the axle, the parts rotating around the king bolt.

Any suitable centrally pivoted axle can be employed for my purpose, provided the braking attachment shortly described, can be installed.

Centrally on the axle I mount rotatably a block 10 and between the block and the standards I mount also rotatably on the axle, spacing members 11 and 12. A pair of forwardly converging draft bars 13 and 14 are provided, these having their rear ends permanently fastened at 15 to the outer ends of the spacer members 11 and 12, and their forward ends connected by a pivot bolt 16 to a pair of forwardly extending draft links 17 and 18 which are forwardly connected by a pivot bolt 19 centrally to the rear part of the truck. The particular point of connection to the truck is immaterial as it is only necessary that the truck pull the trailer through the links and draft bars. Further the particular arrangement of the links and draft bars is not important other than that the draft connection be such that the trailer is permitted to move in towards the truck due to its own momentum. This relative movement of the trailer in respect to the truck is utilized to apply and release the brakes hereinafter described.

An operating bar 20 is pivotally connected forwardly to the truck and is herein shown as fastened by the bolt 19 and said bar has its rear end passing slidably through the upper part of the block 10. An adjusting collar 21 is mounted on the bar 20 and a pressure spring 22 is interposed between the block 10 and the collar.

The standards 6 and 7 carry a pair of aligned bearings 23 and 24 which support rotatably, a cross shaft 25, the shaft having the ends thereof passing through similar end discs 29' permanently fastened to the shaft. The wheels 4 and 5 are provided with brake drums 29, these drums being somewhat less in diameter than the discs so that the ends of the shaft 25 project to the rear of the drum. The brake bands 29<sup>×</sup> provided, pass around the drums 29 and have each an end anchored to one end of the shaft 25 and the other ends provided with links 28 which are connected pivotally to two cranks 26 and 27 secured to the ends of the shaft 25. The ends of the brake bands attached to the shaft 25 are provided with opposing, spaced eyes which receive the shaft and the cranks 26 and 27 are attached to the ends of the shaft between the eyes and ample clearance space is reserved adjacent the cranks to permit the same to swing freely.

Centrally to the shaft 25 I secure a crank 30 which is connected by a link 31 to the rear end of the bar 20.

Under normal conditions when the truck is pulling the trailer, the arrangement provided maintains the brake bands free of the drums. This condition is maintained as long as the centres of the axle 3, the bolt 16, and the bolt 19 are contained in the same plane. However, should the trailer attempt to close in on the truck under its own momentum, the bolt 16 will drop and the bar 20 will cause the crank 30 to swing rearwardly and in a direction such that the shaft 25 is rotated to tighten the brake bands on the drums. This action will brake the front wheels automatically and they will remain braked until such time that the draft is resumed through the links 17 and 18 and bars 13 and 14. The spring acts to cushion the trailer, that is it prevents the brakes from being applied too severely. This cushioning effect can be adjusted by adjusting the collar and in so doing increasing the pressure of the spring 22.

Whilst I have entered into a detailed description of the brake drums and bands, still I wish it to be understood that the construction herein shown might be materially modified without departing from the spirit of the invention, as it is only necessary, in the carrying out of my invention, that the rotation of the shaft 25 be in a proper direction to apply the brakes which arrest the front wheels when the trailer attempts to close up towards the truck pulling the same.

What I claim as my invention is:—

The combination with a draft vehicle and a drawn vehicle having the front axle thereof centrally pivoted for steering purposes and provided at its ends with rotatably mounted front wheels, of a combined steering and draft connection between the vehicles, said connection permitting the advancement of the drawn vehicle towards the draft vehicle under its own momentum, a rotatably mounted cross shaft carried by the rear vehicle, a rigid operating bar anchored to the front vehicle and extending rearwardly to the rear vehicle, a support carried by the rear vehicle and slidably receiving the rear end of the operating bar, a connection between the operating bar and the cross shaft adapted to rotate the cross shaft upon the drawn vehicle advancing towards the draft vehicle under its own momentum, brakes operated by the latter rotation of the shaft adapted to brake the front wheels of the drawn vehicle and a cushioning spring anchored to the operating bar and engaging the drawn vehicle and adapted to carry the dead load of the drawn vehicle upon the pulling vehicle backing.

Signed at Winnipeg, this 15th day of December, 1924.

ALFRED M. W. CARTER.